(12) United States Patent
Segura

(10) Patent No.: US 10,532,874 B1
(45) Date of Patent: Jan. 14, 2020

(54) COMIC BOOK ORGANIZER

(71) Applicant: Christian Segura, Union City, NJ (US)

(72) Inventor: Christian Segura, Union City, NJ (US)

( * ) Notice: Subject to any disclaimer, the term of this patent is extended or adjusted under 35 U.S.C. 154(b) by 0 days.

(21) Appl. No.: 16/194,573

(22) Filed: Nov. 19, 2018

(51) Int. Cl.
*B65D 81/05* (2006.01)
*F16B 2/04* (2006.01)

(52) U.S. Cl.
CPC ............... *B65D 81/05* (2013.01); *F16B 2/04* (2013.01)

(58) Field of Classification Search
CPC ................................. B65D 81/05; F16B 2/04
USPC ............. 312/9.57, 9.63, 35, 190, 183, 334.3
See application file for complete search history.

(56) References Cited

U.S. PATENT DOCUMENTS

| | | | | |
|---|---|---|---|---|
| 182,726 A * | 9/1876 | Whitman | ................... | B42F 7/14 312/190 |
| 1,126,922 A * | 2/1915 | Ulrich | ................. | B42F 15/0094 312/190 |
| 1,640,664 A * | 8/1927 | Moore | ................. | A47B 88/497 384/19 |
| 1,901,243 A * | 3/1933 | Horwitt | ................ | A47K 10/427 221/279 |
| 2,619,233 A * | 11/1952 | Weiskopf | ............... | G03B 21/54 206/449 |
| 2,886,391 A * | 5/1959 | Simpson | .................. | B65G 1/07 312/71 |
| 3,066,825 A * | 12/1962 | Saxe | .................... | A47K 10/427 221/59 |
| 3,291,339 A * | 12/1966 | Hein | ........................ | B65H 1/04 221/45 |
| 3,953,090 A * | 4/1976 | Fuchs | .................... | B42D 5/005 312/183 |
| 4,838,436 A * | 6/1989 | Bailey | ..................... | B42F 17/14 211/10 |
| 4,905,869 A * | 3/1990 | Grigsby | ................. | A47G 19/32 221/124 |
| 4,915,273 A * | 4/1990 | Allen | ........................ | B60R 7/14 211/64 |
| 5,487,601 A * | 1/1996 | Lucardie | ................ | A47B 63/00 211/51 |
| 7,178,689 B2 * | 2/2007 | Wieser | ................. | A47K 10/422 221/45 |
| 8,281,928 B2 | 10/2012 | Smith | | |
| 8,631,968 B2 * | 1/2014 | Taylor | ................. | A47K 10/422 221/36 |
| 9,629,509 B1 * | 4/2017 | Keily | .................. | A47K 10/422 |

(Continued)

*Primary Examiner* — Daniel J Rohrhoff
(74) *Attorney, Agent, or Firm* — Sanchelima & Associates, P.A.; Christian Sanchelima; Jesus Sanchelima

(57) ABSTRACT

The present invention is a clamp for a confined area that restricts undesired movement of objects in an unutilized or void area of confined area and prevents objects from being damaged during transportation. Clamp includes a first wall and a second wall. First wall and second wall are disposed oppositely. Confined area is partially filled with objects such as books and partially void. Clamp includes a first end support, a second end support and a retractable mechanism. Retractable mechanism, such as a scissor mechanism, is disposed between and in connection with first end support and second end support. First end support and second end support are retracted such that first end support is in connection with the first wall and second end support establish contact with objects and fill void space. First end support and second end support are provided with at least one stopper such as an anti-skid bush.

8 Claims, 3 Drawing Sheets

(56) References Cited

U.S. PATENT DOCUMENTS

| | | | | |
|---|---|---|---|---|
| 2004/0036390 A1* | 2/2004 | Woo | ............... | G11B 33/0444 |
| | | | | 312/334.3 |
| 2006/0102641 A1* | 5/2006 | Cittadino | ............ | A47K 10/422 |
| | | | | 221/45 |
| 2015/0076029 A1* | 3/2015 | Corbin | ............. | H01L 21/67369 |
| | | | | 206/521 |

* cited by examiner

COMIC BOOK ORGANIZER

BACKGROUND OF THE INVENTION

1. Field of the Invention

The present disclosure relates to a clamp for use in a confined area. More particularly, the present disclosure relates to a clamp for use in a confined area of a crate or a shelf to support objects and prevent them from falling.

2. Description of the Related Art

Objects, such as books or magazines, are generally introduced in a crate having a confined area and then transported from one place to another. In an event when objects are few and do not occupy the complete area/capacity of crate, it is likely that during transportation objects may tumble in an unutilized or void area of crate and get spoiled or damaged. Hence, there is a need of a clamp that restricts movement of objects in unutilized or void area of crate.

Several designs for various transportation and shipping boxes for transporting and shipping objects have been designed in the past. None of them, however, includes a clamp that restricts undesired movement of objects in an unutilized or void area of a transportation or shipping crate or box.

Applicant believes that a related reference corresponds to a U.S. Pat. No. 8,281,928 filed by Smith Jack for an inflatable box. The Smith reference discloses an inflatable box for use while shipping and having an internal layer inflated to the shape or size of objects and be made up of any rigid material. However, the life of inflatable box is less.

Another related application is WIPO patent application number 2016100760 by The Procter and Gamble Company for a flexible container for easily variable sizing. The patent '760 discloses a non-durable self-supporting flexible container with easily variable sizing. However, the structure of flexible container is complex because of the use of a number of flexible containers placed over each other for varying sizes.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a clamp for use in a confined area that restricts undesired movement of objects in an unutilized or void area and prevent objects from being damaged during transportation.

It is an object of the present invention to provide a clamp for use in a confined area of a crate that is adjusted to be positionable in an unutilized or void area of crate to restrict undesired movement of objects and prevent from being damaged during transportation.

It is yet another object of the present invention to provide a clamp that is interchangeably used with adjustment of size and without any structural modification for different confined areas.

It is still another object of the present invention to provide a clamp that includes a retractable mechanism that retracts in and out a first end support and a second end support to achieve the desired size to fill unutilized or void area of crate.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
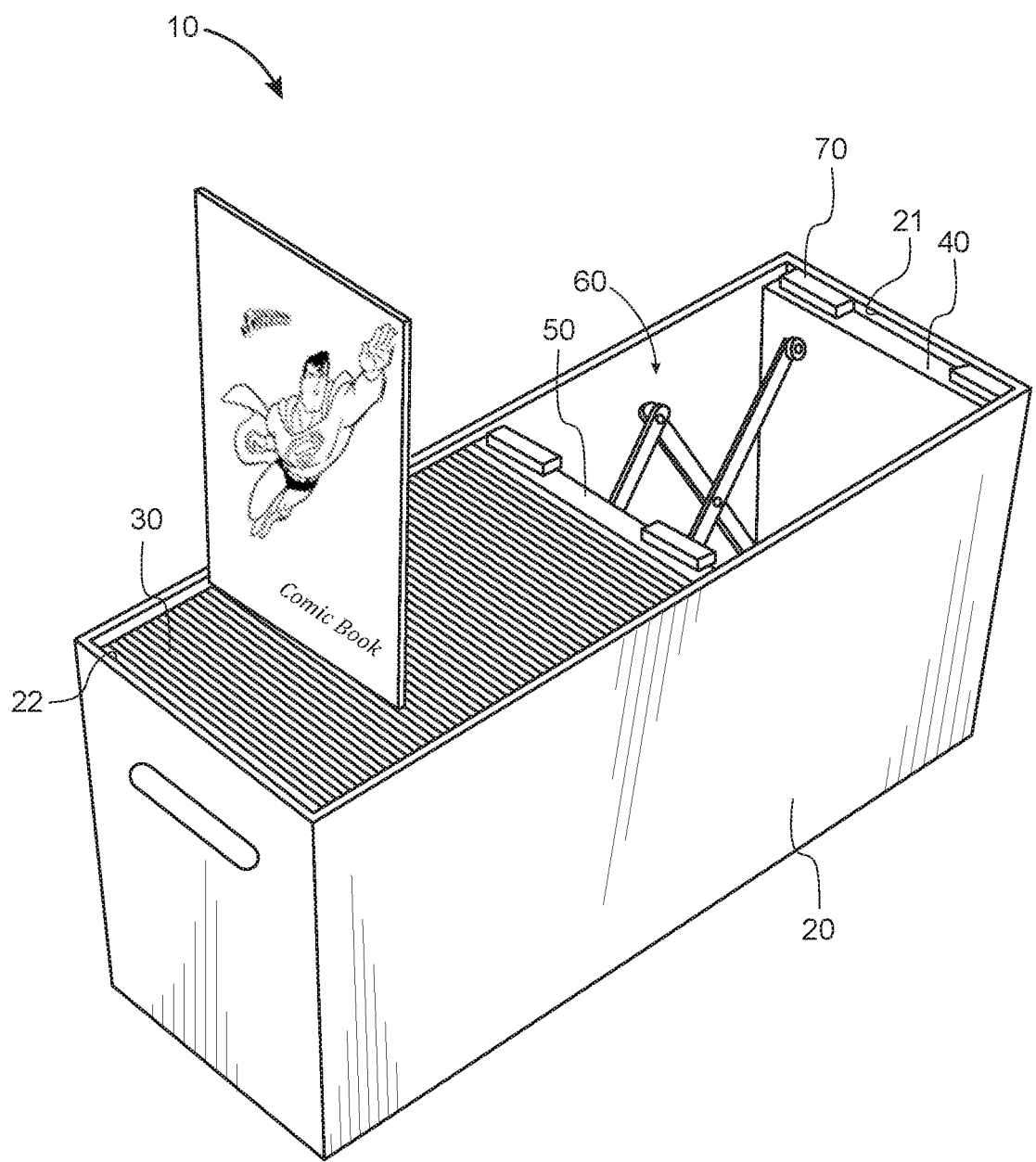
FIG. 1 represents an operative environment of a clamp 10, in accordance with one embodiment of the present disclosure, positioned in a confined area of a crate 20 partially filled with books 30. Clamp 10 mainly includes a first end support 40, a second end support 50 and a retractable mechanism 60 disposed between first end support 40 and second end support 50.
Figure 2:
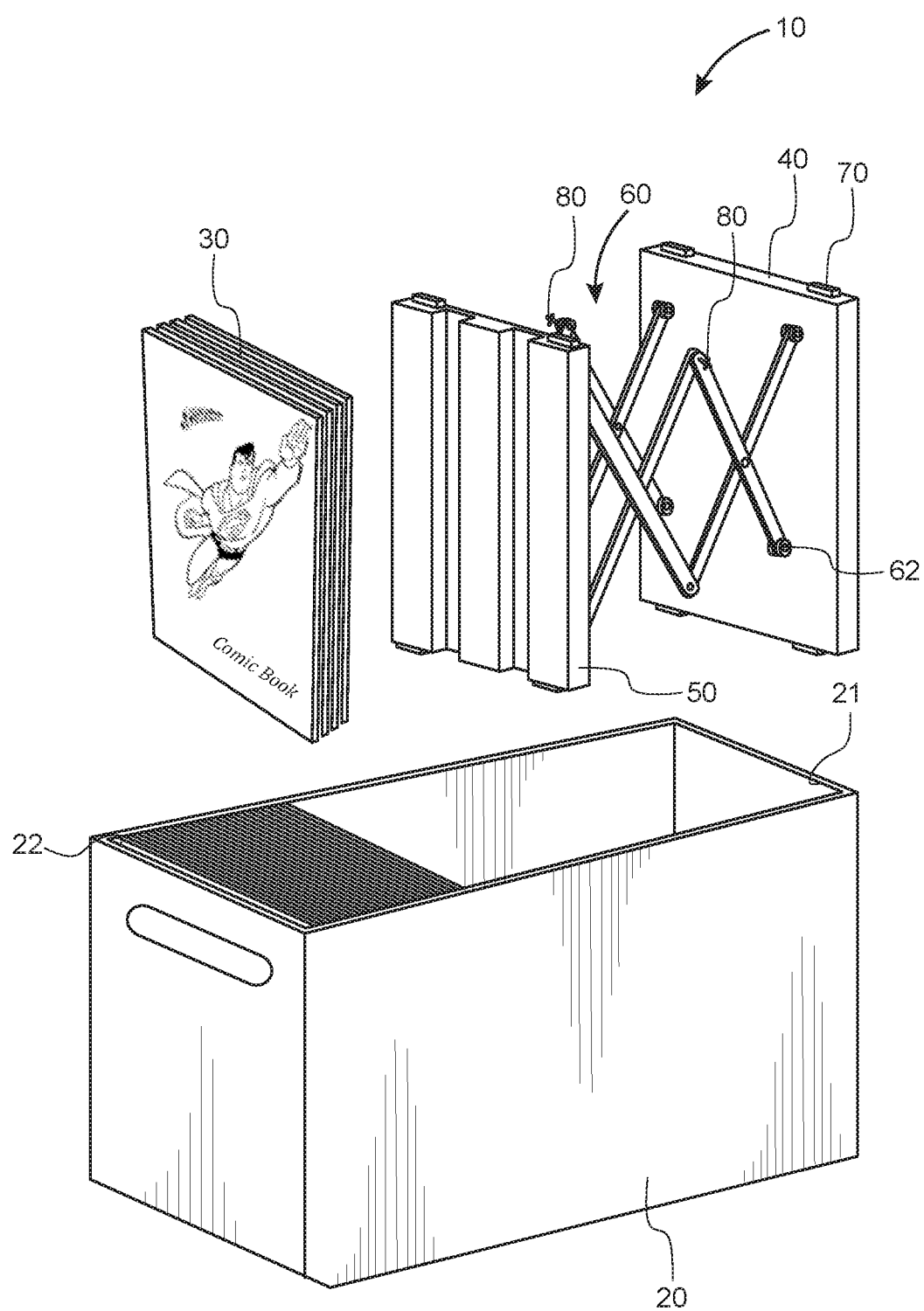
FIG. 2 represents an exploded view of clamp 10, crate 20 and books 30.
Figure 3:
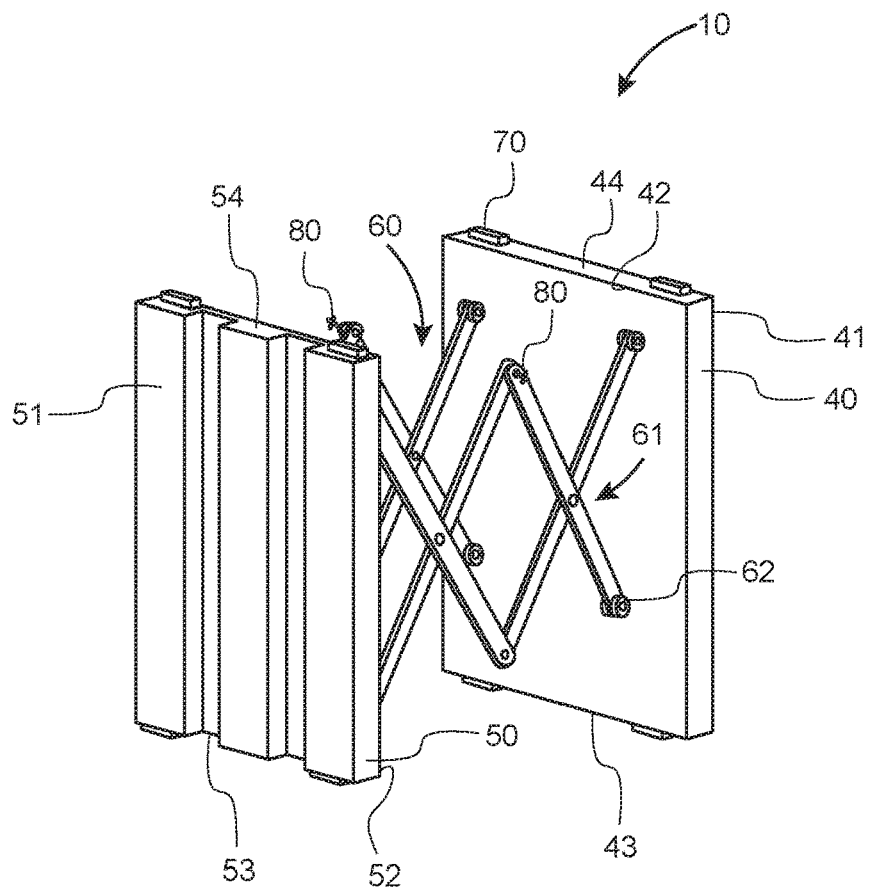
FIG. 3 represents a perspective view of clamp 10.
Figure 4:
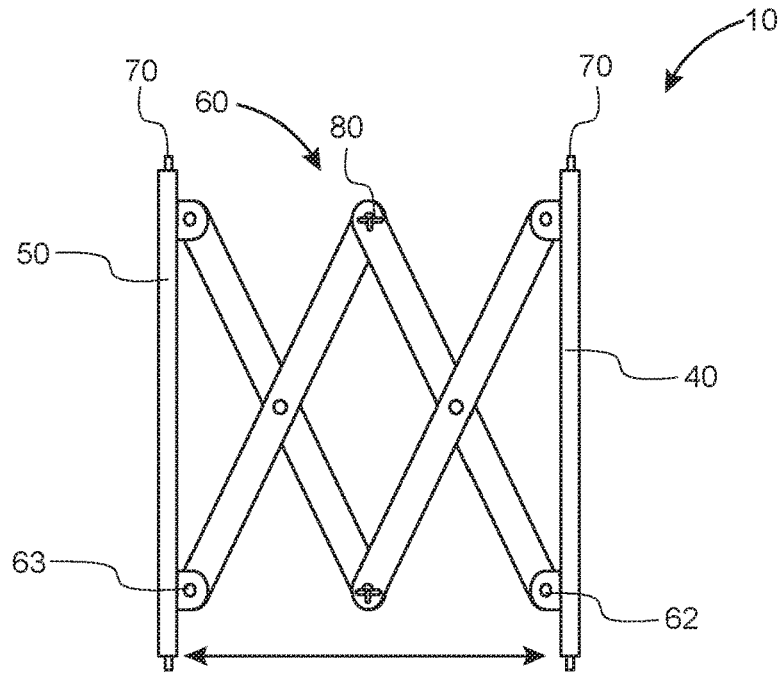
FIG. 4 represents a side view of clamp 10.

Referring now to the drawings, FIGS. 1-4, where the present invention is generally referred to with numeral 10, it can be observed that a clamp, in accordance with one embodiment, is provided for use in a confined area of a crate/box 20 that is partially filled with objects 30 and partially void. Clamp 10 mainly includes a first end support 40, a second end support 50 and a retractable mechanism 60.

First end support 40 is a rigid support made of polymeric, wooden material or any other material that can provide rigid support. In one embodiment, first end support 40 is a square or rectangular shaped and defined with an outer surface 41, an inner surface 42, a base portion 43 and a top portion 44. First end support 40 can be made of any other shapes apart from square or rectangular as mentioned. In an operative environment, outer surface 41 establishes a contact with a first side surface 21 of crate 20.

Second end support 50 is also a rigid support made of polymeric, wooden material or any other material that can provide rigid support. In one embodiment, second end support 50 is a square or rectangular shaped and defined with an outer surface 51, an inner surface 52, a base portion 53 and a top portion 54. Second end support 50 can be made of any other shapes apart from square or rectangular as mentioned. In an operative environment, outer surface 51 establishes a contact with objects 30. Second side surface 22 is oppositely disposed with respect to the first side surface 21 of crate 20.

Retractable mechanism 60 is disposed between first end support 40 and second end support 50. In one embodiment, retracted mechanism 60 is a scissor mechanism that retracts inwards and outwards. Scissor mechanism includes a number of linked parallelograms 61 and pivotal connections 62 that retracts in and out. One end of linked parallelograms 61 is in pivotal connection 62 with inner surface 42 of first end support 40 and another end of linked parallelograms 61 is in pivotal connection 63 with inner surface 52 of second end support 50. In one embodiment, at least one lock nut 80 is provided that restricts movement of at least one linked parallelogram 61 and thereby undesired movement of linked parallelogram 61 during transit.

In operation, retractable mechanism 60 retracts first end support 40 and second end support 50 such that the distance between first end support 40 and second end support 50 is equal to the void or unutilized space in crate 20 and clamp 10 is inserted in the void or unutilized space of crate 20. Thus, clamp 10 fills the void or unutilized space of crate 20 formed between the objects 30 and first side surface 21 of crate 20 and restricts movement of objects 30 in the void or unutilized space of crate 20.

In one embodiment, at least one of base portions 43 and 53 and top portions 44 and 54 are provided with at least one stopper 70 that typically is an anti-skid bush. Stopper 70 provides cushioning and undesired easy movement of first end support 40 and second end support 50 in crate 20.

In an exemplary illustrated embodiment, crate/box 20 is partially filled with reading books 30 or other readable. During transportation, it is likely that the books 30 falls in remaining unutilized or void area of crate/box 20 and may get damaged. Hence, to prevent books from falling, clamp 10 is introduced in the remaining unutilized or void area of crate/box 20. First end support 40 and second end support 50 is retracted by retractable mechanism 60 such that outer surface 41 of first end support 40 is in contact with first side surface 21 of crate 20 and outer surface 51 of second end support 50 is in contact with books 30, thus filling unutilized or void area of crate 20. As second end support 50 is in contact with books 30, books 30 are prevented from falling during transportation.

Though the present disclosure is described with objects 30 as books such as comic books, magazines or storybooks, however, the present disclosure is not limited to consider objects like books, other objects that can be damaged or broken while transport is within the scope of the present disclosure.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A clamp comprising:
   a confined area having a first wall and a second wall, said first wall and said second wall being disposed oppositely, said confined area partially filled with objects and partially void;
   a first end support having an inner surface and an outer surface;
   a second end support having an inner surface and an outer surface; and
   a retractable mechanism being at least one linked parallelogram disposed between said first end support and said second end support, each of said at least one linked parallelogram having a pivotal connection mounted at two predetermined locations on said inner surface of said first end support and said inner surface of said second end support, said pivotal connection being a first pivotal connection and a second pivotal connection, said first pivotal connection being above said second pivotal connection a predetermined distance, said first pivotal connection and said second pivotal connection being on a same vertical plane, said pivotal connection of a first said at least one linked parallelogram being parallel to said pivotal connection of a second said at least one linked parallelogram, said outer surface of said second end support further defined by rectangular protrusions being a first outer portion, a middle portion and a second outer portion evenly spaced apart and extending vertically along a height of said outer surface of said second end support, said outer surface of said second end support further including a first channel recessed therebetween said first outer portion and said middle portion along said height of said outer surface of said second end support, said outer surface of said second end support further including a second channel recessed therebetween said second outer portion and said middle portion along said height of said outer surface of said second end support, said first outer portion, said middle portion and said second outer portion being parallel with respect to one another, said first end support and said second end support are retracted such that said first end support is in connection with the first wall on said outer surface of said first end support and said second end support establish contact with said objects and fill void space.

2. The clamp as claimed in claim 1, wherein said retractable mechanism is a scissor mechanism.

3. The clamp as claimed in claim 1, wherein said first end support is stationary and said second end support is retractable towards and away with respect to said first end support.

4. The clamp as claimed in claim 1, wherein said first end support and said second end support are retractable towards and away with respect to each other.

5. The clamp as claimed in claim 1, wherein said first end support and said second end support defined with at least one stopper.

6. The clamp as claimed in claim 5, wherein said at least one stopper is an anti-skid bush disposed on top portions and base portions of said first end support and said second end support.

7. The clamp as claimed in claim 6, wherein said at least one stopper in mounted to said first outer portion and said second outer portion at said top portion and said base portion thereof.

8. The clamp as claimed in claim 1, wherein said at least one parallelogram includes at least one lock nut mounted thereon to restrict movement of said at least one parallelogram.

\* \* \* \* \*